Patented Nov. 21, 1922.

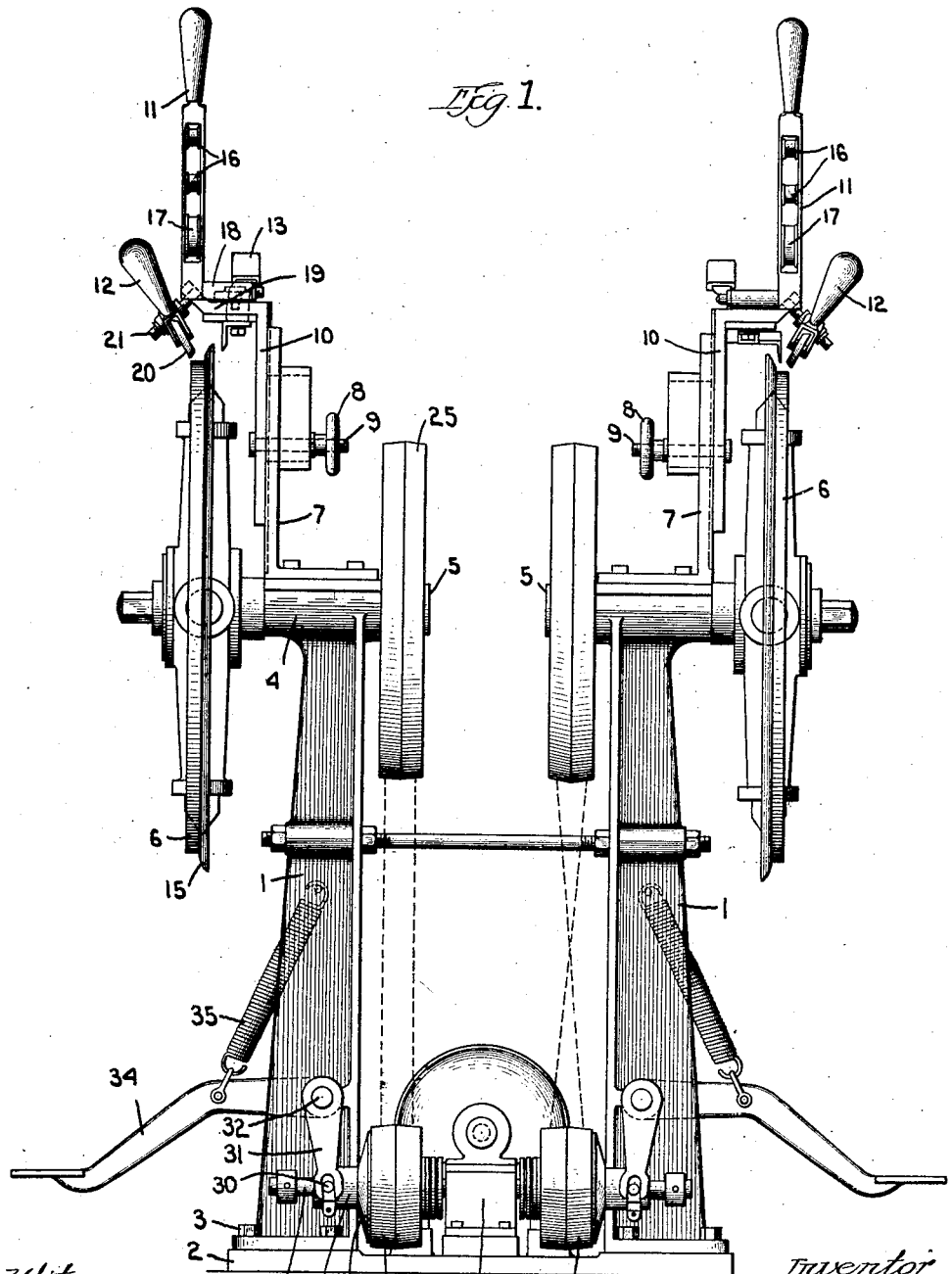

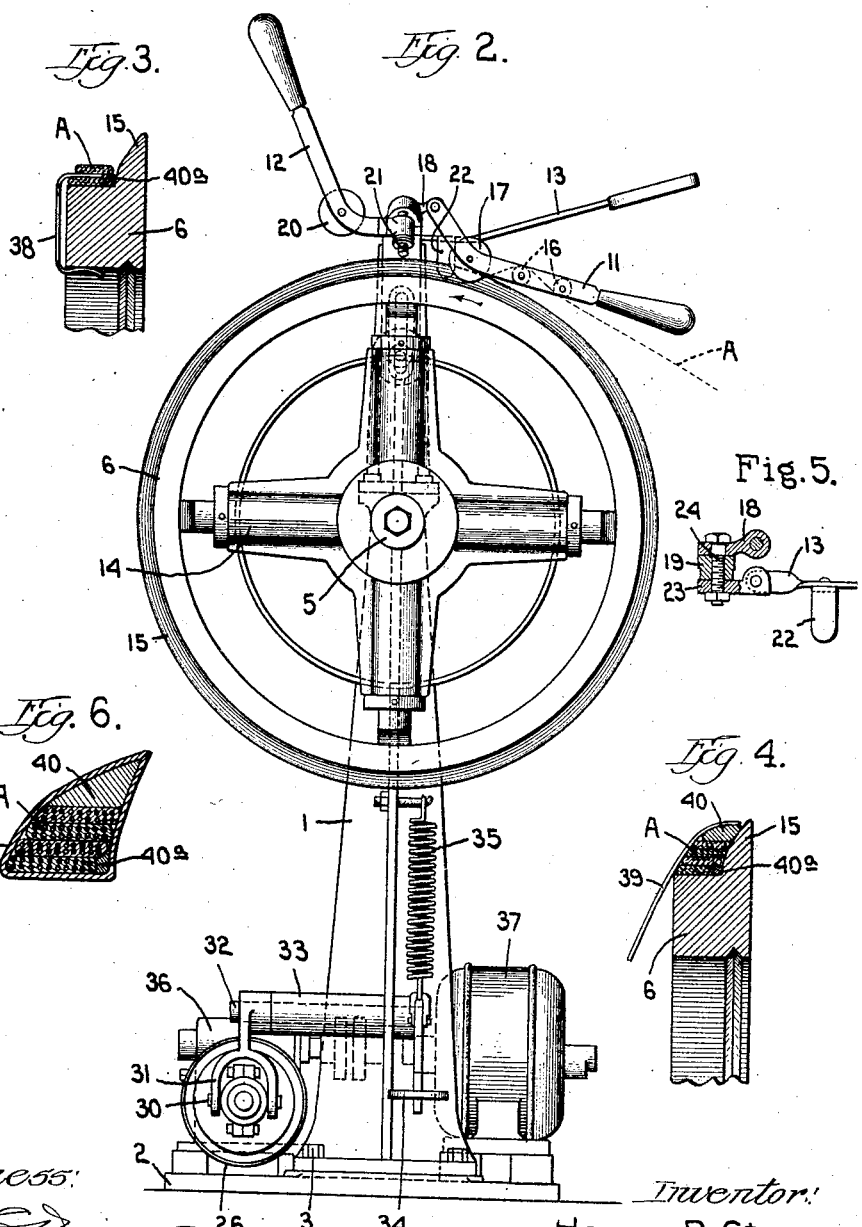

1,436,612

UNITED STATES PATENT OFFICE.

HORACE D. STEVENS, OF AKRON, OHIO, ASSIGNOR TO THE FIRESTONE TIRE AND RUBBER COMPANY, OF AKRON, OHIO, A CORPORATION OF OHIO.

TIRE-BEAD-BUILDING MACHINE.

Application filed February 24, 1920. Serial No. 360,563.

*To all whom it may concern:*

Be it known that I, HORACE D. STEVENS, a citizen of the United States, residing at Akron, in the county of Summit and State of Ohio, have invented certain new and useful Improvements in Tire-Bead-Building Machines, of which the following is a specification.

My invention relates to a new construction of tire bead building machines embodying the many new features of my invention. My invention relates particularly to a machine adapted to the forming of the beads built into the marginal portions of pneumatic tires especially for that type of tire known as the straight side tire in which the beads are formed with a non-elastic center or core which holds the tire on the rim. These beads are usually of a substantially triangular cross section and are composed of strands or strips of braided insulated wire, or rubber, containing a plurality of fibrous strands extending longitudinally thereof.

A further object of the present invention is the provision of an auxiliary means whereby the wrapped bead is easily removed from the bead forming wheel in the finished form ready for vulcanizing.

Another object of this invention is the provision of a bead forming machine in which the convolutions of the strands constituting the bead are evenly disposed so that each wind will be applied under the same tension so that all the convolutions combine to produce a non-stretchable bead.

Other purposes and objects will be apparent as the description proceeds, it being understood that I am not limited in any manner to the details of construction or operation shown, but am entitled to all fair equivalents in the protection afforded by my application.

In the drawings:

Fig. 1 is a side elevation of the machine embodying this invention in one of the preferred forms.

Fig. 2 is an end view thereof.

Fig. 3 is an enlarged transverse section taken through the bead forming wheel, showing the bead in the first period of formation.

Fig. 4 is a view similar to Fig. 3, but showing the bead ready to have the outside wrapper applied.

Fig. 5 is a sectional view taken through the pivotal support for the feeding and stripper arms.

Fig. 6 is a transverse section through the finished tire bead ready for vulcanizing.

In the present invention I make the machine with two of my apparatus driven from the same motor and so constructed that they comprise a unit of two bead forming wheels, taking up very little floor space.

As both apparatus are similar in construction, one only will be described.

Stand 1 is secured to base plate 2 by suitable bolts 3, the upper part of stand 1 is formed into the journal box 4, in which the shaft 5 of the bead forming wheel 6 is rotatably mounted.

Fastened to the top of the journal box is a bracket 7 having adjustably secured thereto by a clamping nut 8 and a stud 9, a bracket 10, on which the feed roll handle 11, the roller handle 12, and the stripper handle 13 are pivotally mounted. The inner surface of the bead forming wheel is cut with a V-shaped groove, adapted to receive the arms of the chuck spider 14 which is carried and rotated by the drive shaft 5. The periphery of this wheel is shown having an annular flange 15 which forms an angular rabbet or groove on the circumference of the wheel, in which are wound the convolutions of wire on the material forming the bead. Figs. 3 and 4 show this in detail. The material A which is received from any suitable source of supply is fed on the wheel through the slotted handle 11 over flanged tension rollers 16 that are carried by the handle. The material is then guided under the flanged roller 17, which is in like manner carried by the handle 11, and is also used to press the material on to the bead as it is built up. The handle 11 is pivotally mounted to the fulcrum 18, the latter being pivoted to a laterally projecting boss 19 of the bracket 10, thus producing a universal joint connection for the handle 11. Means for rolling or stitching the material while on the wheel is provided as in beveled roller 20, journaled on the handle or arm 12. The arm 12 is pivoted on a stud 21 integral with the boss 19.

After the beads are completed, they are stripped from the form 6 by the stripper 22, which has a knife-like edge, that when applied wedges between the bead and the flange 15. The stripper 22 is mounted on the arm 13 which is pivoted on another fulcrum 23. Fulcrum 23 is pivotally secured to the boss 19 by a bolt 24, which also serves to secure fulcrum 18 to the boss 19.

Upon the opposite end of the shaft 5 to the bead form is a drive pulley 25, which is belted to a friction clutch 26. The clutch pulley 26 is mounted upon a shaft 27, having a central bearing 36, and is acted upon by friction disc 28 slidable on the shaft 27 and having a sleeve 29 integral therewith. Clamped on the sleeve 29 is a yoke having pins 30 therein and engaging the forked crank 31 which is connected through a shaft 32 journaled in the laterally extending boss 33 to the foot pedal 34 which is held up by a spring 35 that normally tends to keep the friction disc out of contact with the clutch. In bearing 36 are journaled a worm and gear of well-known construction which are driven through a flexible coupling by the motor 37, the latter being mounted on the base plate 2.

Referring to Fig. 3, a spring clip is shown at 38. This clip is placed on the starting end of the material and holds it from slipping, and keeps it in place during the first few turns of the wheel.

In Fig. 4 is seen a section through the bead material with the wrapper 39 being attached.

In the operation of the present apparatus to produce the desired bead, a strip of heavily coated or insulated braided wire, or any material that will be practically non-stretchable, is wound around the form, having the angular groove conforming to the shape of two sides of the finished bead. Strips of rubber, or waste material, 40, known as fillers, are generally used in the manufacture of beads, being wound on top of the wire after the desired number of convolutions have been laid up, the material filling in during vulcanization, and due to the pressure of the molding elements, the bead will be formed in the correct triangular shape desired for the finished bead.

In the operation of the apparatus here shown, the flat braided insulated wire A which comes from any suitable source of supply, usually a roll upon which it is wound as received from the insulating machine, is threaded under and over the two rollers 16, and under the roller 17, by which it is pressed against the form. By exerting pressure on the end of the lever 11, the operator is enabled to lay up turns of braided wire in the proper manner and by lateral movement of the handle position them properly in place, the flanges guiding the wire in its movement. It is customary to start the first layer of wire at the edge of the channel or recess in the form, as shown in Fig. 3, and step back each layer so that the wire will conform nearly to the lower half of the bead. After the desired number of turns of wire have been laid up on the form, being drawn from the supply by the rotation of the form, the operator stops the form and cuts the wire at the proper point.

The filler material is now supplied on the top of the wire. As shown at 40, this is a rounded strip of material which is placed on top of the wire to fill out the point or vertical angle of the bead. It is usually composed of rubber or rubber containing waste material, in which is contained fibrous material found in tire factories. A strip of this material is laid around the form by the operator and the roller 20 is brought against the filler to roll it in place. The covering fabric 39 is now applied and placed over the outside of the bead by the hand of the operator, the outer edge being allowed to overhang as shown in Fig. 4.

The bead is now completed as far as this apparatus is concerned and the blade 22 on the stripper lever is inserted behind the bead and the lever moved outwardly to strip the bead from the form. The operator now folds back the free edge of the fabric covering strip so that the under side of the bead is covered and the green bead is ready for the vulcanizing press in which it is given the preliminary vulcanization prior to being placed in the tire.

In some instances it may be desired to place a small strip of filler in the right angle of the bead, when a large bead is being made. If so, this is applied before the wire is laid upon the form. Such a secondary filler is shown at 40ª.

It will be noted that the pivoted mounting of the lever is such as to give a freedom of movement to the rollers by which the bead material may be easily and accurately guided into place. By means of the apparatus here shown, the straight side beads may be quickly and accurately made and time and material are saved over prior methods and apparatus of building.

While the description has been somewhat detailed, it is understood that details of the machine are not essential and may be varied widely. Changes and modifications may be made within the scope of the invention and the claims are intended to be considered as broadly as the spirit of the invention.

I claim:

1. A tire bead building apparatus, comprising a support, a revoluble transverse shaft, a bead forming wheel on which the bead is constructed on said shaft, means to rotate the shaft, laterally shiftable means carried by said support to feed the material onto the bead forming wheel, and means for stitching the material, said stitching means being also carried by the support.

2. A tire building machine, comprising a support, a revoluble transverse shaft, a bead forming wheel on said shaft, means to rotate the shaft, and means to strip the finished bead from the forming wheel.

3. A tire bead building apparatus, comprising a support, a revoluble transverse shaft mounted therein, means to rotate the shaft, a bead forming wheel on said shaft, and an adjustable bracket secured to said support carrying, feeding, stitching, and stripping instrumentalities adjustably secured thereto.

4. In an apparatus for manufacturing tire beads from wire tape, a bead form conforming to the internal circumference of the bead, a bead form supporting and rotating means, and means mounted on said form support for shifting the tape transversely of the form.

5. In an apparatus of the character described, a form on which the bead is built up conforming to the internal circumference of the bead, a bead form support, means for rotating the form on the support, and vertically and laterally movable guiding and pressing means for the bead material.

6. In an apparatus of the character set forth, a bead form, means for supporting said bead form, means for rotating the form, a lever pivoted on the support for universal movement and means on said lever for guiding the bead material and pressing it into place.

7. In an apparatus of the character set forth, a bead form, means for supporting said bead form, means for rotating the form, a pivoted arm on said support and tension and pressure rollers for the bead wire on said arms.

8. In an apparatus of the character set forth, a bead form, means for supporting said bead form, means for rotating the form, a universally jointed arm on said support, tension and pressure rollers on said arm and means on said rollers for guiding the bead wire.

9. In an apparatus of the character described, a bead form, means for supporting said bead form, means for rotating the form, a pivoted lever on said support, bead wire pressing and guiding rollers on said lever, a second pivoted lever on the support, a second pressing roller on the last named arm, and stripper mechanism for forcing the bead away from the form.

10. In an apparatus of the character described, a bead form, means for supporting the bead form, means for rotating the form, means for guiding and pressing bead wire on the form, means for rolling the bead and a stripper device for removing the bead from the form.

11. In an apparatus of the character set forth, a bead form, means for supporting the bead form, means for rotating the form, a plurality of levers pivoted to the support over the form, including a bead wire guiding and pressing lever, a second pressure roller supporting lever, and a stripper lever.

12. In an apparatus of the character set forth, a bead form, means for supporting the bead form, means for rotating the form, a plurality of levers pivoted to the support over the form, including a bead wire guiding and pressing lever, a second pressure roller supporting lever, and a stripper lever, said levers being so mounted as to move in vertical and horizontal planes.

13. A device for building tire beads comprising a bead form, a support for carrying the form on which the bead is built up, means for rotating the form to draw material thereon, a lever and means thereon to guide and tension the material as it passes to the form and a movable mounting for said guiding and tensioning lever.

HORACE D. STEVENS.